US011920534B2

(12) United States Patent
Matsumoto

(10) Patent No.: US 11,920,534 B2
(45) Date of Patent: Mar. 5, 2024

(54) CONTROLLER AND METHOD FOR CONTROLLING VEHICLE

(71) Applicant: TOYOTA JIDOSHA KABUSHIKI KAISHA, Aichi-ken (JP)

(72) Inventor: Takashi Matsumoto, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/194,652

(22) Filed: Apr. 3, 2023

(65) Prior Publication Data

US 2023/0323829 A1 Oct. 12, 2023

(30) Foreign Application Priority Data

Apr. 6, 2022 (JP) ................................ 2022-063459

(51) Int. Cl.
*F02D 41/02* (2006.01)

(52) U.S. Cl.
CPC .......... *F02D 41/029* (2013.01); *F02D 41/027* (2013.01); *F02D 2200/0812* (2013.01)

(58) Field of Classification Search
CPC ................ F02D 41/029; F02D 41/027; F02D 2200/0812
See application file for complete search history.

(56) References Cited

U.S. PATENT DOCUMENTS 10,836,397 B1 * 11/2020 Christensen ........ F16H 61/0213
11,624,303 B1 * 4/2023 Wendling ............. B60W 20/40 701/22
2018/0106206 A1 * 4/2018 Tsunoda ................ B60W 10/08
2019/0292959 A1 * 9/2019 Dudar ................... F01N 13/009
2020/0180440 A1 * 6/2020 Uchimura ............... B60L 58/12

FOREIGN PATENT DOCUMENTS

JP 2018-65448 A 4/2018

* cited by examiner

*Primary Examiner* — Brandon D Lee
(74) *Attorney, Agent, or Firm* — HAUPTMAN HAM, LLP

(57) ABSTRACT

A CPU is configured to executes a filter regeneration process, a firing process, and a stopping process. The CPU is configured to stop rotation of a crankshaft of an internal combustion engine mounted on a vehicle on the condition that the vehicle is decelerating after termination of the firing process in the stopping process.

19 Claims, 3 Drawing Sheets

CONTROLLER AND METHOD FOR CONTROLLING VEHICLE

RELATED APPLICATIONS

The present application claims priority of Japanese Application Number 2022-063459 filed on Apr. 6, 2022, the disclosure of which is hereby incorporated by reference herein in its entirety.

BACKGROUND

1. Field

The following description relates to a controller and method for controlling a vehicle.

2. Description of Related Art

Japanese Laid-Open Patent Publication No. 2018-065448 describes a vehicle including an internal combustion engine, a motor-generator, and a battery. The internal combustion engine includes an exhaust passage, through which exhaust flows, and a filter, which collects particulate matter from the exhaust. A controller, of which the subject of control is the vehicle, cooperates with the internal combustion engine and the motor-generator to drive the vehicle. When driving the internal combustion engine and the motor-generator, the controller executes a filter regeneration process for regenerating the filter on condition that a PM accumulation amount, or the accumulated amount of the particulate matter collected by the filter, is greater than or equal to a specified accumulation amount, which is determined in advance. Further, the controller terminates the filter regeneration process on condition that the temperature of the filter is greater than or equal to a predetermined temperature threshold value. The controller executes a firing process that injects fuel from a fuel injection valve and ignites the fuel with an ignition plug upon termination of the filter regeneration process.

In the vehicle described in Japanese Laid-Open Patent Publication No. 2018-065448, the crankshaft of the internal combustion engine is rotating when the filter regeneration process is being executed and when the firing process is being executed. When the crankshaft is rotating, intake valves and exhaust valves of the internal combustion engine open and close. Thus, the internal combustion engine will perform intake and exhaust actions. This will produce noise and vibration that may be perceived by the vehicle occupant.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller is applied to a vehicle. The vehicle includes an internal combustion engine, a motor-generator, and a battery. The internal combustion engine includes a cylinder, a fuel injection valve that injects fuel into the cylinder, an ignition plug that performs ignition in the cylinder, an exhaust passage through which exhaust flows from the cylinder, and a filter that collects particulate matter from the exhaust. The motor-generator is coupled to a crankshaft of the internal combustion engine. The battery is supplied with electric power from the motor-generator. The controller includes processing circuitry configured to execute an accumulation amount calculation process, a filter regeneration process, a firing process, and a stopping process. The accumulation amount calculation process calculates a PM accumulation amount that is an accumulated amount of the particulate matter collected by the filter. The filter regeneration process stops injection of fuel from the fuel injection valve during rotation of the crankshaft of the internal combustion engine so as to burn the particulate matter collected by the filter on condition that the vehicle is decelerating and the PM accumulation amount is greater than or equal to a specified accumulation amount determined in advance. The firing process injects fuel from the fuel injection valve and performs ignition with the ignition plug upon termination of the filter regeneration process on condition that temperature of the filter is greater than or equal to a predetermined temperature threshold value and the vehicle is decelerating. The stopping process stops rotation of the crankshaft of the internal combustion engine on condition that the vehicle is decelerating after the firing process is terminated.

In another general aspect, a control method is applied to a vehicle. The vehicle includes an internal combustion engine, a motor-generator, and a battery. The internal combustion engine includes a cylinder, a fuel injection valve that injects fuel into the cylinder, an ignition plug that performs ignition in the cylinder, an exhaust passage through which exhaust flows from the cylinder, and a filter that collects particulate matter from the exhaust. The motor-generator is coupled to a crankshaft of the internal combustion engine. The battery is supplied with electric power from the motor-generator. The control method includes an accumulation amount calculation process, a filter regeneration process, a firing process, and a stopping process. The accumulation amount calculation process calculates a PM accumulation amount that is an accumulated amount of the particulate matter collected by the filter. The filter regeneration process stops injection of fuel from the fuel injection valve during rotation of the crankshaft of the internal combustion engine so as to burn the particulate matter collected by the filter on condition that the vehicle is decelerating and the PM accumulation amount is greater than or equal to a specified accumulation amount determined in advance. The firing process injects fuel from the fuel injection valve and performs ignition with the ignition plug upon termination of the filter regeneration process on condition that temperature of the filter is greater than or equal to a predetermined temperature threshold value and the vehicle is decelerating. The stopping process stops rotation of the crankshaft of the internal combustion engine on condition that the vehicle is decelerating after the firing process is terminated.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

One embodiment of a vehicle controller will now be described with reference to the drawings. In the present embodiment, the vehicle controller is installed in a vehicle.

Schematic Configuration of Vehicle

A vehicle 100, which is the controlled subject of the vehicle controller, will now be described.

Figure 1:
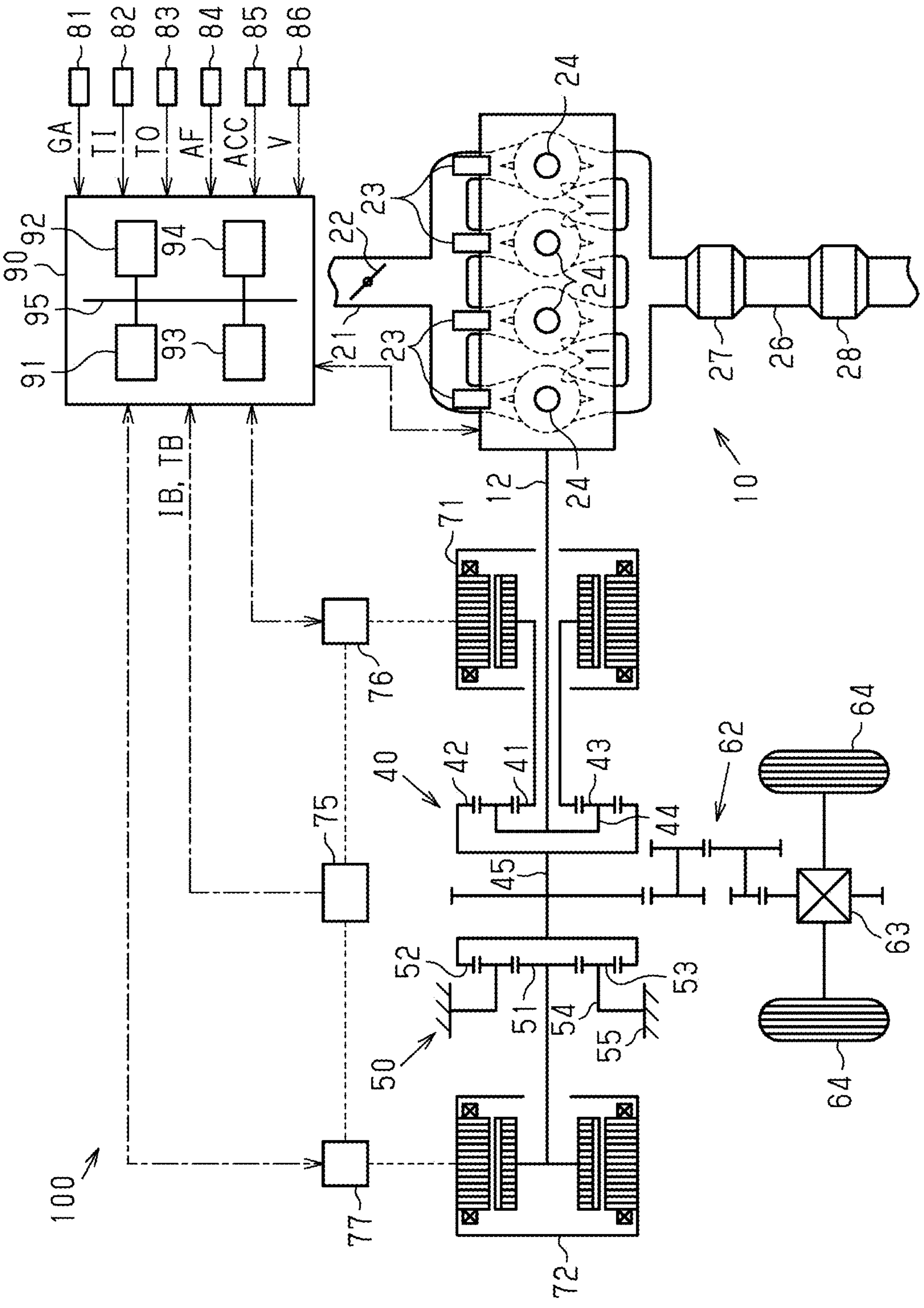
FIG. 1 is a schematic diagram of a vehicle.

As shown in FIG. 1, the vehicle 100 includes an internal combustion engine 10, which is of a spark-ignition type. Further, the vehicle 100 includes a first motor-generator 71 and a second motor-generator 72, which have the functions of both electric motor and electric generator. Thus, the vehicle 100 is a hybrid electric vehicle.

The internal combustion engine 10 includes cylinders 11, a crankshaft 12, an intake passage 21, and a throttle valve 22. Further, the internal combustion engine 10 includes fuel injection valves 23, ignition plugs 24, an exhaust passage 26, a catalyst 27, and a filter 28.

Each cylinder 11 is a chamber where the mixture of fuel and air is burned. The internal combustion engine 10 includes four cylinders 11. The intake passage 21 is connected to the cylinders 11. The intake passage 21 at a portion including its downstream end is branched into four passages. The branched passages are each connected to one of the cylinders 11. The intake passage 21 delivers intake air from outside the internal combustion engine 10 to each of the cylinders 11. The throttle valve 22 is located at the upstream side of the branched portion in the intake passage 21. The throttle valve 22 regulates the amount of intake air flowing through the intake passage 21.

The fuel injection valves 23 are located near the downstream end of the intake passage 21. The internal combustion engine 10 includes four fuel injection valves 23 corresponding to the four cylinders 11, respectively. The fuel injection valves 23 inject fuel, which is supplied from a fuel tank (not shown), into the intake passage 21. More specifically, each fuel injection valve 23 supplies fuel via the intake passage 21 to the corresponding cylinder 11. The ignition plugs 24 are located in the cylinders 11, respectively. The internal combustion engine 10 includes four ignition plugs 24 corresponding to the four cylinders 11, respectively. Each ignition plug 24 produces a spark discharge to ignite the mixture of fuel and air.

The exhaust passage 26 is connected to the cylinders 11. The exhaust passage 26 at a portion including its upstream end is branched into four passages. The branched passages are each connected to one of the cylinders 11. The exhaust passage 26 expels exhaust from each of the cylinders 11 out of the internal combustion engine 10.

The catalyst 27 is located at the downstream side of the branched portion in the exhaust passage 26. The catalyst 27 purifies the exhaust flowing through the exhaust passage 26. The filter 28 is located at the downstream side of the catalyst 27 in the exhaust passage 26. The filter 28 collects particulate matter from the exhaust flowing through the exhaust passage 26.

The crankshaft 12 is coupled to pistons (not shown) that are located in the cylinders 11. The fuel burned in each cylinder 11 moves the piston that is located in the cylinder 11. This rotates the crankshaft 12, which is coupled to the piston.

The vehicle 100 includes a first planetary gear mechanism 40, a ring gear shaft 45, a second planetary gear mechanism 50, a reduction gear mechanism 62, a differential gear mechanism 63, and drive wheels 64.

The first planetary gear mechanism 40 includes a sun gear 41, a ring gear 42, pinion gears 43, and a carrier 44. The sun gear 41 is an external gear. The sun gear 41 is connected to the first motor-generator 71. The ring gear 42 is an internal gear and coaxial with the sun gear 41. Each pinion gear 43 is located between the sun gear 41 and the ring gear 42. Further, each pinion gear 43 is meshed with both of the sun gear 41 and the ring gear 42. The carrier 44 supports the pinion gears 43. The pinion gears 43 are rotatable. Further, the pinion gears 43 are allowed to revolve about the sun gear 41 when rotated together with the carrier 44. The carrier 44 is connected to the crankshaft 12.

The ring gear shaft 45 is connected to the ring gear 42. Further, the ring gear shaft 45 is connected via the reduction gear mechanism 62 and the differential gear mechanism 63 to the drive wheels 64. The reduction gear mechanism 62 reduces the speed of the rotation of the ring gear shaft 45 and outputs the rotation at the reduced speed. The differential gear mechanism 63 allows the left and right drive wheels 64 to be rotated at different speeds.

The second planetary gear mechanism 50 includes a sun gear 51, a ring gear 52, pinion gears 53, a carrier 54, and a case 55. The sun gear 51 is an external gear. The sun gear 51 is connected to the second motor-generator 72. The ring gear 52 is an internal gear and coaxial with the sun gear 51. The ring gear 52 is connected to the ring gear shaft 45. Each pinion gear 53 is located between the sun gear 51 and the ring gear 52. Further, each pinion gear 53 is meshed with both of the sun gear 51 and the ring gear 52. The carrier 54 supports the pinion gears 53. The pinion gears 53 are rotatable. The carrier 54 is fixed to the case 55. Thus, the pinion gears 53 cannot be revolved about the sun gear 51.

The vehicle 100 includes a battery 75, a first inverter 76, and a second inverter 77.

The battery 75 is a rechargeable battery. The first inverter 76 performs AC-DC conversion between the first motor-generator 71 and the battery 75. Further, the first inverter 76 regulates the amount of electric power transferred between the first motor-generator 71 and the battery 75. The second inverter 77 performs AC-DC conversion between the second motor-generator 72 and the battery 75. The second inverter

77 regulates the amount of electric power transferred between the second motor-generator 72 and the battery 75.

The vehicle 100 includes an airflow meter 81, an intake air temperature sensor 82, an exhaust temperature sensor 83, an air-fuel ratio sensor 84, an accelerator depression amount sensor 85, and a vehicle speed sensor 86.

The airflow meter 81 is located at the upstream side of the throttle valve 22 in the intake passage 21. The airflow meter 81 detects the intake air amount GA, which is the amount of intake air flowing through the intake passage 21 per unit time. The intake air temperature sensor 82 detects the intake air temperature TI, which is the temperature of the intake air flowing through the intake passage 21. The exhaust temperature sensor 83 detects the exhaust temperature TO, which is the temperature of the exhaust flowing through the exhaust passage 26 into the filter 28. The air-fuel ratio sensor 84 detects the exhaust air-fuel ratio AF of the exhaust flowing through the exhaust passage 26 and entering the filter 28. The accelerator depression amount sensor 85 detects the accelerator depression amount ACC, which is the amount an accelerator pedal is depressed by the driver. The vehicle speed sensor 86 detects the vehicle speed V, which is the speed of the vehicle 100.

Controller

The vehicle 100 includes a controller 90. The controller 90 controls the vehicle 100. The controller 90 obtains a signal indicating the intake air amount GA from the airflow meter 81. The controller 90 obtains a signal indicating the intake air temperature TI from the intake air temperature sensor 82. The controller 90 obtains a signal indicating the exhaust temperature TO from the exhaust temperature sensor 83. The controller 90 obtains a signal indicating the exhaust air-fuel ratio AF from the air-fuel ratio sensor 84. The controller 90 obtains a signal indicating the accelerator depression amount ACC from the accelerator depression amount sensor 85. The controller 90 obtains a signal indicating the vehicle speed V from the vehicle speed sensor 86. The controller 90 obtains signals indicating the current IB of the battery 75 and the battery temperature TB from the battery 75.

The controller 90 includes a CPU 91, a peripheral circuit 92, a ROM 93, a memory device 94, and a bus 95. The bus 95 connects the CPU 91, the peripheral circuit 92, the ROM 93, and the memory device 94 in a manner allowing for communication with one another. The peripheral circuit 92 includes a power supply circuit, a reset circuit, a circuit that generates a clock signal for synchronizing internal operations, or the like. The ROM 93 stores, in advance, programs used by the CPU 91 to execute various controls. The CPU 91 executes the programs stored in the ROM 93 to control the vehicle 100.

Control of Vehicle

The CPU 91 calculates a required vehicle driving force from the accelerator depression amount ACC and the vehicle speed V. The required vehicle driving force is the driving force required for the vehicle 100 to travel. The CPU 91 determines, from the required vehicle driving force, the torque distribution of the internal combustion engine 10, the first motor-generator 71, and the second motor-generator 72. Based on the torque distribution of the internal combustion engine 10, the first motor-generator 71, and the second motor-generator 72, the CPU 91 controls the output of the internal combustion engine 10 and the powering and regenerative operations of the first motor-generator 71 and the second motor-generator 72.

Based on the torque distribution of the internal combustion engine 10, the first motor-generator 71, and the second motor-generator 72, the CPU 91 calculates a target value for the output of the internal combustion engine 10. Based on the target value for the output of the internal combustion engine 10, the CPU 91 sends a control signal to the internal combustion engine 10 to control the open degree of the throttle valve 22, the amount of fuel injected from the fuel injection valves 23, the ignition timing of the ignition plugs 24, and the like. Further, the CPU 91 sends a control signal to the first inverter 76 to control the first motor-generator 71 via the first inverter 76. The CPU 91 also sends a control signal to the second inverter 77 to control the second motor-generator 72 via the second inverter 77.

The CPU 91 calculates the state of charge SOC and the input upper limit value Win of the battery 75 to determine the torque distribution. The CPU 91 calculates the state of charge SOC from the cumulated value of the current IB. Based on the calculated state of charge SOC and the battery temperature TB, the CPU 91 calculates the input upper limit value Win, which is the maximum permissible power by which the battery 75 can be charged. The input upper limit value Win is expressed by zero or a positive value. A larger absolute value of the input upper limit value Win allows the battery 75 to be charged with greater electric power. The CPU 91 determines the torque distribution of the internal combustion engine 10, the first motor-generator 71, and the second motor-generator 72 so as to maintain the state of charge SOC of the battery 75 within a constant control range.

Accumulation Amount Calculation Process

The CPU 91 executes an accumulation amount calculation process to calculate a PM accumulation amount DA that is an accumulated amount of the particulate matter collected by the filter 28. The CPU 91 executes, repeatedly in predetermined cycles, a program stored in the ROM 93 to calculate the PM accumulation amount DA. The CPU 91, for example, repeats execution of the program stored in the ROM 93 for calculation of the PM accumulation amount DA to implement the accumulation amount calculation process.

When the CPU 91 initiates the program for calculating the PM accumulation amount DA, the CPU 91 calculates the generated PM amount and the regenerated PM amount. The CPU 91 calculates the PM accumulation amount DA by updating the PM accumulation amount DA. More specifically, the CPU 91 adds the difference obtained by subtracting the regenerated PM amount from the generated PM amount to the pre-updated PM accumulation amount DA in order to calculate the most recent PM accumulation amount DA and update the PM accumulation amount DA.

The generated PM amount is the amount of particulate matter generated by the combustion of the air-fuel mixture in the cylinders 11. The CPU 91 calculates the generated PM amount from the intake air amount GA, the injected fuel amount, and the like.

The regenerated PM amount is the amount of particulate matter burned in the filter 28. When the exhaust temperature TO increases, the temperature of the filter 28 increases. The exhaust temperature TO is the temperature of the exhaust flowing into the filter 28. Thus, the temperature of the filter 28 can be obtained from the temperature detected by the exhaust temperature sensor 83. The CPU 91 calculates the filter temperature TF, which is the temperature of the filter 28, using a heat balance model of the filter 28 that is based on the flow rate of the exhaust flowing into the filter 28, the exhaust temperature TO, and the temperature of the ambient air. The flow rate of the exhaust flowing into the filter 28 can be obtained from the intake air amount GA and the injected fuel amount. The intake air temperature TI detected by the intake air temperature sensor 82 may be used as the temperature of the ambient air. Combustion of the particulate matter accumulated in the filter 28 occurs when exhaust including oxygen flows into the filter 28 in a state in which the filter temperature TF is greater than or equal to the ignition temperature of the particulate matter. Oxygen is required to burn the particulate matter. Thus, the amount of particulate matter burned in the filter 28 is determined in accordance with the amount of oxygen in the exhaust flowing into the filter 28. The oxygen concentration of the exhaust flowing into the filter 28 can be obtained from the detection of the air-fuel ratio sensor 84. Thus, the CPU 91 calculates the regenerated PM amount based on the exhaust temperature TO detected by the exhaust temperature sensor 83, the oxygen concentration, which is the exhaust air-fuel ratio AF detected by the air-fuel ratio sensor 84, the intake air amount GA, and the injected fuel amount.

Series of Processes Including Regeneration Process

The CPU 91 executes regeneration control that includes a filter regeneration process, a firing process, a stopping process, and a deceleration force adjustment process. The CPU 91 executes a program stored in the ROM 93 to implement the regeneration control when the PM accumulation amount DA exceeds a specified accumulation amount DAS, which is determined in advance. More specifically, the regeneration control is implemented by the CPU 91 that executes the regeneration control program stored in the ROM 93 when the PM accumulation amount DA exceeds the specified accumulation amount DAS. The specified accumulation amount DAS, set in advance based on experiments and simulations, is the amount of accumulated particulate matter at which the filter regeneration process should be performed and corresponds to a relatively large amount of particulate matter collected in the filter 28.

Figure 2:
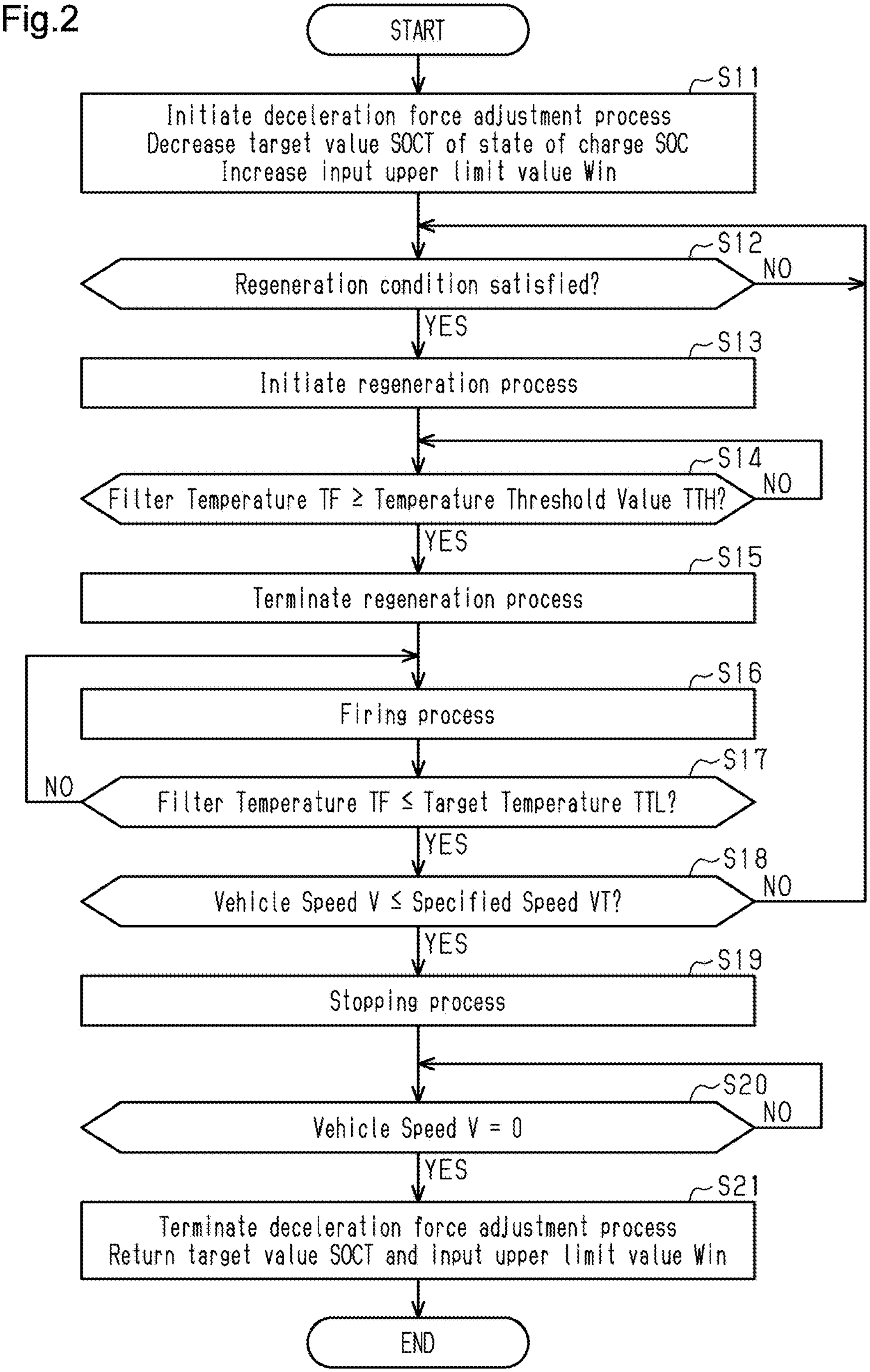
FIG. 2 is a flowchart illustrating a series of processes executed during regeneration control.

In detail, as shown in FIG. 2, the CPU 91 first performs step S11 when starting the regeneration control program. In step S11, the CPU 91 initiates the deceleration force adjustment process. In the deceleration force adjustment process, the CPU 91 first sets a target value SOCT for the state of charge SOC of the battery 75 that is smaller than the target value SOCT that was set prior to initiation of the regeneration control. The target value SOCT is a median value between the upper limit value and the lower limit value in the control range of the state of charge SOC. In this manner, the target value SOCT is set to be smaller than that prior to initiation of the regeneration control in order to shift the entire control range of the state of charge SOC toward the negative side at which values become smaller. Thus, the CPU 91 controls the vehicle 100 so that the state of charge SOC of the battery 75 is maintained in the control range shifted so that its values are smaller than the values of the control range prior to initiation of the regeneration control.

Then, the CPU 91 sets the input upper limit value Win to a value larger than the value that was set prior to initiation of the regeneration control. Thus, the amount of electric power generated by the second motor-generator 72 is increased when the second motor-generator 72 functions as an electric generator. This increases the deceleration force that is the regeneration braking force corresponding to the amount of electric power generated by the second motor-generator 72. Then, the CPU 91 proceeds to step S12.

In step S12, the CPU 91 determines whether a regeneration condition for performing the filter regeneration process is satisfied. The regeneration condition includes the vehicle 100 decelerating. More specifically, the CPU 91 stores time-series data of the vehicle speed V, which is obtained from the vehicle speed sensor 86, in the memory device 94. The CPU 91 determines whether the vehicle 100 is decelerating from the time-series data of the vehicle speed V. When the regeneration condition is not satisfied (S12: NO), the CPU 91 repeats step S12. When the regeneration condition is satisfied (S12: YES), the CPU 91 proceeds to step S13. After determining in step S12 that the regeneration condition is satisfied, if the regeneration condition becomes unsatisfied, the CPU 91 cancels subsequent processing of the regeneration control and ends the regeneration control.

In step S13, the CPU 91 executes the filter regeneration process. The filter regeneration process is a process for burning the particulate matter collected by the filter 28. Step S13 is executed when the condition for initiating the regeneration control is satisfied and an affirmative determination is given in step S12. Accordingly, the filter regeneration process of step S13 is executed on the condition that the PM accumulation amount DA is greater than or equal to the specified accumulation amount DAS and the vehicle 100 is decelerating.

The filter regeneration process includes a temperature raising process and an oxygen supplying process. The temperature raising process raises the temperature of the filter 28 to a specified temperature, which is determined in advance, or greater. In the temperature raising process, the CPU 91 stops the spark ignition performed by the ignition plugs 24 to stop combustion in the cylinders 11. In this state, fuel is injected from the fuel injection valves 23. Further, the CPU 91 controls the throttle valve 22 so that air flows through the intake passage 21. As a result, air-fuel mixture flows to the exhaust passage 26 without being burned in the cylinders 11. When the non-burnt air-fuel mixture flows to the exhaust passage 26, the air-fuel mixture is burned in the catalyst 27. When fuel is injected in such a manner, the amount of fuel injected is such that it can all be burned in the catalyst 27. Thus, fuel does not flow out of the catalyst 27 toward the downstream side.

In this manner, the CPU 91 injects fuel to generate heat with the catalyst 27. The CPU 91 transfers the heat generated by the catalyst 27 toward the downstream side using the exhaust flowing through the exhaust passage 26 as a medium. This transfers the heat generated by the catalyst 27 to the filter 28. When the temperature of the filter 28 becomes greater than or equal to the ignition temperature of the particulate matter, the particulate matter accumulated in the filter 28 is burned.

The oxygen supplying process, which is performed after the temperature raising process is terminated, supplies oxygen to the filter 28 to burn the particulate matter accumulated in the filter 28. In the oxygen supplying process, the CPU 91 stops the spark plug ignition performed by the ignition plugs 24 and stops the injection of fuel from the fuel injection valves 23. Further, in the oxygen supplying process, the CPU 91 controls the throttle valve 22 so that air flows through the intake passage 21. The pumping action of pistons (not shown) moving up and down in the cylinders 11 sends air to the filter 28. The oxygen supplying process is executed on the condition that the filter temperature TF is greater than or equal to a specified temperature. The specified temperature is greater than or equal to the ignition temperature of the particulate matter. In this manner, the CPU 91 initiates the filter regeneration process. Then, the CPU 91 proceeds to step S14.

In step S14, the CPU 91 determines whether the filter temperature TF is greater than or equal to the temperature threshold value TTH. The temperature threshold value TTH is greater than the specified temperature. The temperature threshold value TTH is the temperature at which the particulate matter accumulated in the filter 28 will melt and is set in advance based on simulations and experiments. When the filter temperature TF is less than the temperature threshold value TTH (S14: NO), the CPU 91 repeats step S14. When the filter temperature TF is greater than or equal to the temperature threshold value TTH (S14: YES), the CPU 91 proceeds to step S15.

In step S15, the CPU 91 terminates the filter regeneration process. Then, the CPU 91 proceeds to step S16.

In step S16, the CPU 91 executes the firing process. The firing process injects fuel from the fuel injection valves 23 and ignites the fuel with the ignition plugs 24. In the firing process, the CPU 91 retards the ignition timing of the ignition plugs 24 from the timing that would occur when the firing process is not executed. The amount of fuel injected during the firing process is less than the amount of fuel injected when the internal combustion engine 10 is idling. Idling is a state in which the internal combustion engine 10 runs at the substantially lowermost point of its operational range. As described above, step S16 is performed in a state in which the regeneration condition is satisfied. Accordingly, the firing process is performed on the condition that the filter temperature TF is greater than or equal to the temperature threshold value TTH and the vehicle 100 is decelerating.

In this manner, the CPU 91 terminates the filter regeneration process and initiates the firing process in steps S15 and S16. Then, the CPU 91 proceeds to step S17.

In step S17, the CPU 91 determines whether the filter temperature TF is less than or equal to a target temperature TTL. The target temperature TTL is the temperature at which the filter 28 is sufficiently cooled and set in advance based on simulations and experiments. When the filter temperature TF is greater than the target temperature TTL (S17: NO), the CPU 91 returns to step S16. Thus, when the filter temperature TF is higher, the firing process is performed for a longer period until the filter temperature TF falls to the target temperature TTL. When the filter temperature TF is less than or equal to the target temperature TTL (S17: YES), the CPU 91 proceeds to step S18.

In step S18, the CPU 91 determines whether the vehicle speed V is less than or equal to a specified speed VT. The specified speed VT is the minimum vehicle speed V allowing the air required for the regeneration process to be supplied to the filter 28 when the regeneration process of step S13 is executed, and set in advance based on simulations and experiments. When the vehicle speed V is less than or equal to the specified speed VT (S18: YES), the CPU 91 proceeds to step S19.

In step S19, the CPU 91 terminates the firing process and executes the stopping process. The stopping process stops rotation of the crankshaft 12 of the internal combustion engine 10. More specifically, in the stopping process, the CPU 91 stops the ignition performed by the ignition plugs 24. Further, the CPU 91 stops the injection of fuel from the fuel injection valves 23. Additionally, the CPU 91 controls the throttle valve 22 and stops the flow of air through the intake passage 21. Then, the CPU 91 controls the first motor-generator 71 and the second motor-generator 72 so that the required vehicle driving force is obtained although the rotation of the crankshaft 12 becomes zero. As described above, step S19 is performed after step S16 in a state in which the regeneration condition is satisfied. Accordingly, the stopping process is executed on the condition that the vehicle 100 decelerates after the firing process. Subsequent to step S19, the CPU 91 proceeds to step S20.

In step S20, the CPU 91 determines whether the vehicle speed V is zero. When the vehicle speed V is not zero (S20: NO), the CPU 91 repeats step S20. When the vehicle speed Vis zero (S20: YES), the CPU 91 proceeds to step S21.

In step S21, the CPU 91 terminates the deceleration force adjustment process. More specifically, the CPU 91 returns the target value SOCT, which is the control median for the state of charge SOC of the battery 75, to the value prior to initiation of the regeneration control. Further, the CPU 91 returns the input upper limit value Win to the value prior to initiation of the regeneration control. Then, the CPU 91 ends the series of processes in the regeneration control.

In step S18, when the vehicle speed V is greater than the specified speed VT (S18: NO), the CPU 91 returns to step S12. More specifically, when the conditions described below are satisfied, the CPU 91 executes the filter regeneration process of step S13 again. The conditions are, after the firing process of step S16 is terminated, the vehicle 100 is decelerating, the PM accumulation amount DA is greater than or equal to the specified accumulation amount DAS, and the vehicle speed V is greater than the specified speed VT.

After starting the regeneration control, if the PM accumulation amount DA becomes less than the specified accumulation amount DAS, the CPU 91 cancels all subsequent processing of the regeneration control and ends the regeneration control.

Operation of Embodiment

The operation of the embodiment will now be described using an example in which the vehicle 100 decelerates after traveling at a constant speed.

Figure 3:
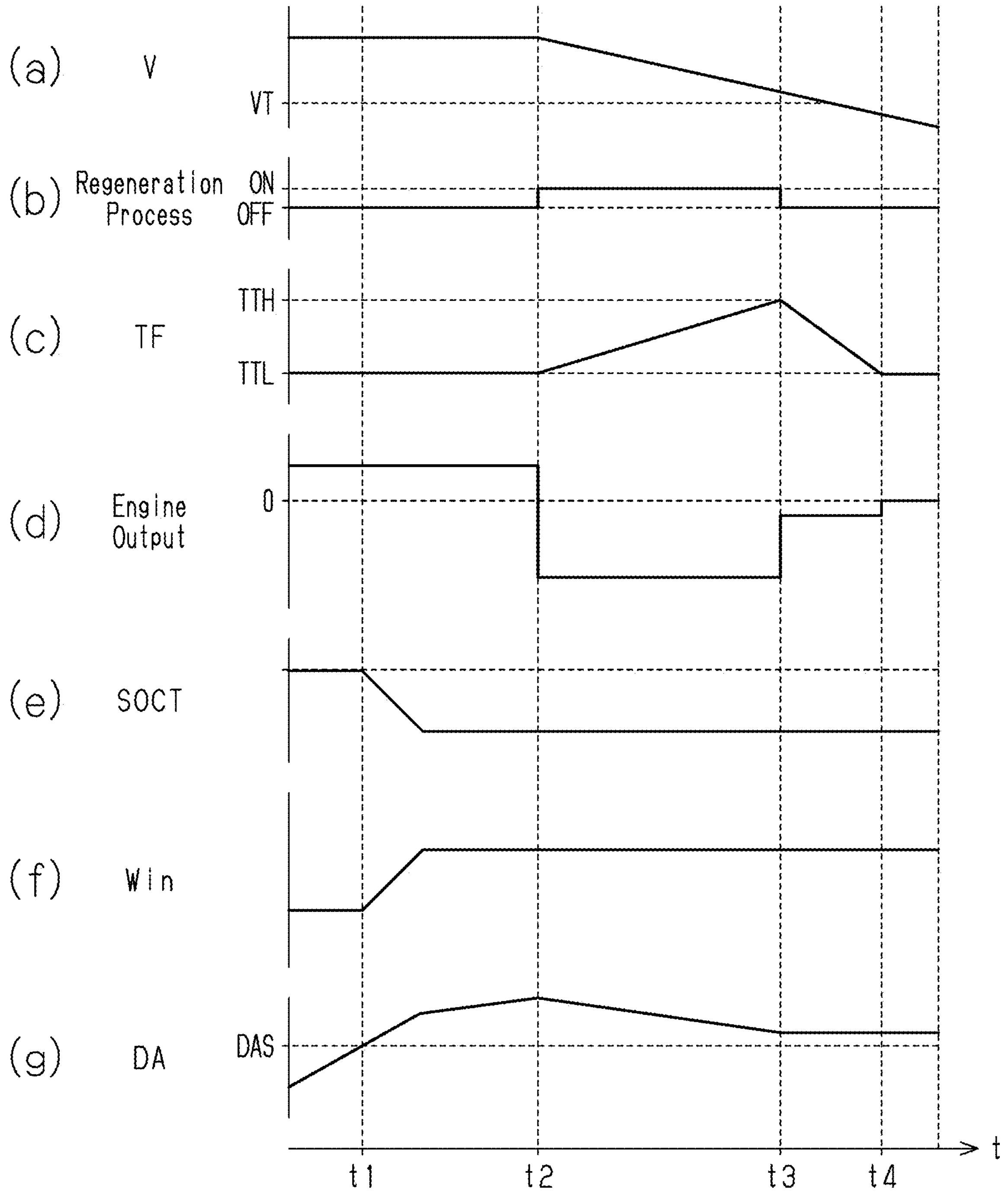
FIG. 3 is a time chart illustrating a state in which the traveling vehicle decelerates from a constant speed, in which section (a) is a time chart of the vehicle speed, section (b) is a time chart of the regeneration process, section (c) is a time chart of the filter temperature, section (d) is a time chart of the internal combustion engine output, section (e) is a time chart of the state of charge target value, section (f) is a time chart of the battery input upper limit value, and section (g) is a time chart of the PM accumulation amount.

As shown in FIG. 3 in section (a), the vehicle 100 travels at a constant vehicle speed V from time t1 to time t2. As shown in FIG. 3 in section (g), the PM accumulation amount DA gradually increases as the vehicle 100 travels. At time t1, the PM accumulation amount DA reaches the specified accumulation amount DAS.

When the PM accumulation amount DA becomes greater than or equal to the specified accumulation amount DAS, the CPU 91 executes the regeneration control program. Further, at time t1, the CPU 91 initiates the deceleration force adjustment process. Consequently, as shown in FIG. 3 in section (e), the target value SOCT for the state of charge SOC of the battery 75 is set to a value smaller than that set prior to initiation of the regeneration control. Additionally, as shown in FIG. 3 in section (f), the input upper limit value Win is set to a value larger than that set prior to initiation of the regeneration control. Afterwards, the electric power generated by the first motor-generator 71 and the second motor-generator 72 increases. This increases the deceleration force generated by the first motor-generator 71 and the second motor-generator 72.

Then, as shown in FIG. 3 in section (a), the vehicle 100 starts to decelerate at time t2. As shown in FIG. 3 in section (b), at time t2, the filter regeneration process is satisfied, and the CPU 91 initiates the filter regeneration process. In FIG. 3 in section (b), ON indicates that the filter regeneration process is being executed, and OFF indicates that the filter regeneration process is not being executed. As shown in FIG. 3 in section (c), the filter temperature TF starts to rise from time t2. Further, as shown in FIG. 3 in section (d), combustion occurs in the cylinders 11 until time t2. Thus, the output of the internal combustion engine 10 is a positive value and corresponds to a driving force. From time t2, combustion does not occur in the cylinders 11. Thus, the output of the internal combustion engine 10 is a negative value and corresponds to a deceleration force. As shown in FIG. 3 in section (g), the PM accumulation amount DA starts to decrease from time t2.

Then, as shown in FIG. 3 in section (c), at time t3, the filter temperature TF reaches the temperature threshold value TTH. Thus, the CPU 91 terminates the filter regeneration process and initiates the firing process. Thus, as shown in FIG. 3 in section (b), the filter regeneration process is terminated at time t3. In the firing process, the amount of fuel injected is less that the amount of fuel injected when the internal combustion engine 10 is idling. Thus, the torque resulting from combustion is not enough for overcoming the frictional force that exists in the internal combustion engine 10. Accordingly, as shown in FIG. 3 in section (d), at time t3, the output of the internal combustion engine 10 is a negative value that is greater than that from time t2 to time t3 during which the filter regeneration process is performed. Consequently, the output of the internal combustion engine 10 during execution of the firing process is a deceleration force that is weaker than the output of the internal combustion engine 10 during execution of the filter regeneration process.

Then, as shown in FIG. 3 in section (d), at time t4, the firing process is terminated. As shown in FIG. 3 in section (c), at time t4, the filter temperature TF is lower than that at time t3. Further, as shown in FIG. 3 in section (a), at time t4, the vehicle speed V is less than or equal to the specified speed VT. Thus, at time t4, the CPU 91 executes the stopping process because the vehicle speed V is less than or equal to the specified speed VT. This stops rotation of the crankshaft 12. As shown in FIG. 3 in section (d), at time t4, the output of the internal combustion engine 10 becomes zero. Thus, at time t4, deceleration force will no longer be obtained from the internal combustion engine 10. At time t4, as shown in FIG. 3 in section (f), the input upper limit value Win of the battery 75 is still set to a value larger than that set prior to initiation of the regeneration control. This increases the amount of electric power generated by the first motor-generator 71 and the second motor-generator 72 when the first motor-generator 71 and the second motor-generator 72 function as electric generators during deceleration of the vehicle 100. Consequently, a large deceleration force, which is the regenerative braking force corresponding to the amount of electric power generated by the first motor-generator 71 and the second motor-generator 72, acts on the vehicle 100. Then, although not illustrated in the drawings, for example, when the vehicle 100 stops and the vehicle speed V becomes zero, the CPU 91 terminates the deceleration force adjustment process. This returns the target value SOCT of the state of charge SOC and the input upper limit value Win to the values that were set prior to execution of the regeneration control.

Advantages of Embodiment (1) In the above embodiment, after terminating the firing process, the CPU 91 executes the stopping process that stops driving the internal combustion engine 10. Thus, after the firing process is terminated, the crankshaft 12 does not rotate in a situation in which noise and vibration would be produced when the vehicle 100 is decelerating if the internal combustion engine 10 were to perform intake and exhaust actions. Accordingly, under such a situation, noise and vibration that would result from the intake and exhaust actions of the internal combustion engine 10 is not produced.

(2) In the above embodiment, after terminating the firing process, the CPU 91 executes the stopping process on the condition that the vehicle speed V is less than or equal to the specified speed VT. Further, after terminating the firing process, the CPU 91 executes the filter regeneration process again under condition that the vehicle speed V is greater than the specified speed VT. Thus, when the vehicle speed V is low such that noise and vibration can easily be perceived, the stopping process is executed to reduce vibration and noise of the internal combustion engine 10. When the vehicle speed V is high such that the regeneration process can be executed appropriately, the filter regeneration process is executed again to decrease the PM accumulation amount DA.

(3) In the above embodiment, in the firing process, the CPU 91 retards the ignition timing of the ignition plugs 24 from the ignition timing when the firing process is not executed. Thus, less heat is transferred to the exhaust passage 26 as compared to the ignition timing set for a case in which the firing process is not executed. This reduces the heat transferred to the filter 28 during the firing process. As a result, the filter temperature TF can easily be decreased.

(4) In the above embodiment, the CPU 91 executes the firing process until the filter temperature TF falls to the target temperature TTL. Thus, when the filter temperature TF is higher, the CPU 91 executes the firing process for a longer period. This allows the filter temperature TF to be sufficiently decreased even if the filter temperature TF is relatively high.

(5) In the above embodiment, when the crankshaft 12 of the internal combustion engine 10 stops, the CPU 91 executes the deceleration force adjustment process to increase the electric power that can be supplied from the first motor-generator 71 and the second motor-generator 72 to the battery 75. This increases the maximum value of the deceleration force acting on the vehicle 100 and generated when the first motor-generator 71 and the second motor-generator 72 generate electric power. This avoids a situation in which the deceleration force becomes insufficient when the crankshaft 12 of the internal combustion engine 10 stops rotating.

(6) During the firing process, among the deceleration forces acting on the vehicle 100, the deceleration force produced by the internal combustion engine 10 becomes smaller than that during the regeneration process. In the above embodiment, the CPU 91 initiates the deceleration force adjustment process before the firing process. Thus, a large amount of electric power can be supplied to the battery 75 during the firing process. This increases the maximum value of the deceleration force acting on the vehicle 100 and generated when the first motor-generator 71 and the second motor-generator 72 generate electric power. As a result, a situation in which the deceleration force becomes insufficient when the crankshaft 12 of the internal combustion engine 10 stops rotating can be avoided even in the firing process.

(7) In the deceleration force adjustment process of the above embodiment, the target value SOCT for the state of charge SOC of the battery 75 is set to be smaller than that set prior to initiation of the regeneration control. Thus, even if the first motor-generator 71 and the second motor-generator 72 generate electric power to produce deceleration force during the firing process and the stopping process, the battery 75 will not be overcharged.

Other Embodiments

The above-described embodiment may be modified as described below. The above embodiments and the modified examples described below may be combined as long as there is no technical contradiction.

The deceleration force adjustment process does not have to be executed at the time described in the example of the above embodiment. For example, the CPU 91 may execute the deceleration force adjustment process together with the stopping process after terminating the firing process. That is, the deceleration force adjustment process may be executed during the stopping process. Further, the deceleration force adjustment process does not have to be terminated at the time described in the example of the above embodiment. For example, the CPU 91 may terminate the deceleration force adjustment process when the vehicle speed V becomes less than or equal to a predetermined speed. The predetermined speed is a speed that allows sufficient deceleration force to act on the vehicle 100 even if the deceleration force adjustment process is not executed and can be set based on experiments and simulations.

In the above embodiment, the electric power supplied to the battery 75 does not have to be increased by increasing the input upper limit value Win in the deceleration force adjustment process. For example, the electric power supplied to the battery 75 can be restricted when the deceleration force adjustment process is not executed, and not restricted when the deceleration force adjustment process is executed.

In the deceleration force adjustment process of the above embodiment, the target value SOCT for the state of charge SOC of the battery 75 does not have to be decreased. Further, the deceleration force adjustment process can be eliminated.

The period during which the firing process is executed does not have to be in accordance with the filter temperature TF and may be fixed. For example, the firing period may be executed for a fixed period, which is set in advance based on simulations and experiments, irrelevant of the filter temperature TF.

In the firing process, the ignition timing of the ignition plugs 24 does not have to be retarded. Even in such a case, the filter temperature TF in the firing process will be lower than that when the regeneration process is executed. Further, for example, when a variable valve mechanism is included in the internal combustion engine 10, the variable valve mechanism may be controlled in the firing process so as to restrict the transfer of the heat, generated by combustion in the cylinders 11, to the exhaust passage 26.

After the firing process is terminated, the filter regeneration process does not have to be executed again. That is, after the firing process is terminated, the CPU 91 can execute the stopping process regardless of the vehicle speed V.

The accumulation amount calculation process is not limited to the example of the above embodiment as long as the PM accumulation amount DA can be calculated. For example, the PM accumulation amount DA can be calculated from the pressure difference between the front and rear sides of the filter 28.

In the filter regeneration process, the supply of fuel can be stopped in some of the cylinders 11 and continued in other cylinders 11.

The configuration of the controller 90 is not limited to the example of the embodiment described above. The controller 90 may be circuitry including one or more processors that run on computer programs (software) to execute various processes. The controller 90 may be circuitry including one or more dedicated hardware circuits, such as application-specific integrated circuits (ASICs) that execute at least some of the processes, or a combination of processors and hardware circuits. Each processor includes the CPU 91 and a memory such as a RAM and the ROM 93. The memory stores program codes or instructions configured to have the CPU 91 execute processes. The memory, namely, a computer readable medium, includes any available medium that is accessible by a versatile or dedicated computer.

In the embodiment described above, the structure of the vehicle 100 may be modified. For example, the internal combustion engine 10 can include three or less cylinders 11 or five or more cylinders 11.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for a vehicle, wherein the vehicle includes:

an internal combustion engine including a cylinder, a fuel injection valve configured to inject fuel into the cylinder, an ignition plug configured to perform ignition in the cylinder, an exhaust passage through which exhaust flows from the cylinder, and a filter configured to collect particulate matter from the exhaust;

a motor-generator coupled to a crankshaft of the internal combustion engine; and a battery configured to be supplied with electric power from the motor-generator;

the controller comprising:

processing circuitry configured to execute:

an accumulation amount calculation process that calculates a PM accumulation amount that is an accumulated amount of the particulate matter collected by the filter;

in response to the vehicle decelerating and the PM accumulation amount being greater than or equal to a specified accumulation amount determined in advance, a filter regeneration process that stops injection of the fuel from the fuel injection valve during rotation of the crankshaft of the internal combustion engine so as to burn the particulate matter collected by the filter;

after the filter regeneration process is terminated, in response to the vehicle decelerating and a temperature of the filter being greater than or equal to a predetermined temperature threshold value, a firing process that injects the fuel from the fuel injection valve and performs ignition with the ignition plug; and after the firing process is terminated, in response to the vehicle decelerating and a speed of the vehicle being less than or equal to a specified speed determined in advance, a stopping process that stops the rotation of the crankshaft of the internal combustion engine, wherein the specified speed is a minimum speed of the vehicle allowing air required for the filter regeneration process to be supplied to the filter when the filter regeneration process is executed.

2. The controller according to claim 1, wherein:

the processing circuitry is configured to, after the firing process is terminated, in response to (i) the PM accumulation amount being greater than or equal to the specified accumulation amount determined in advance, (ii) the vehicle decelerating, and (iii) the speed of the vehicle being greater than the specified speed, execute the filter regeneration process again.

3. The controller according to claim 1, wherein the processing circuitry is configured to retard an ignition timing of the ignition plug in the firing process from that when the firing process is not executed.

4. The controller according to claim 1, wherein the processing circuitry is configured to execute the firing process for a longer period when the temperature of the filter is higher.

5. The controller according to claim 1, wherein the processing circuitry is configured to execute a deceleration force adjustment process that allows more electric power to be supplied from the motor-generator to the battery when the stopping process is executed than when the stopping process is not executed.

6. The controller according to claim 5, wherein the processing circuitry is configured to initiate the deceleration force adjustment process before initiating execution of the firing process.

7. The controller according to claim 3, wherein the processing circuitry is configured to cause the fuel injection valve to inject the fuel wherein an amount of fuel injected during the firing process is less than an amount of fuel injected when the internal combustion engine is idling.

8. The controller according to claim 4, wherein the processing circuitry is configured to, in response to the temperature of the filter being less than or equal to a target temperature and the speed of the vehicle being less than or equal to the specified speed, execute the stopping process.

9. The controller according to claim 6, wherein the processing circuitry is configured to execute the deceleration force adjustment process to set a target value for a state of charge of the battery to be smaller than that set prior to initiating execution of a regeneration control, the regeneration control including the filter regeneration process, the firing process, the stopping process, and the deceleration force adjustment process.

10. The controller according to claim 9, wherein the processing circuitry is configured to execute the deceleration force adjustment process to further set an input upper limit value to be a value larger than that set prior to initiating the execution of the regeneration control, and the input upper limit value is a maximum permissible power by which the battery can be charged.

11. The controller according to claim 10, wherein the processing circuitry is configured to, in response to the speed of the vehicle becoming zero subsequent to the stopping process, terminate the deceleration force adjustment process, to return the target value for the state of charge of the battery and the input upper limit value to those prior to initiating the execution of the regeneration control.

12. The controller according to claim 1, wherein the filter regeneration process includes a temperature raising process and an oxygen supplying process, and the controller is configured to execute:

the temperature raising process that stops the ignition with the ignition plug to stop combustion in the cylinder, performs the injection of the fuel from the fuel injection valve, and allows air-fuel mixture to flow to a catalyst without being burned in the cylinder, causing (i) the catalyst to generate heat by burning the air-fuel mixture and (ii) the heat generated by the catalyst to transfer to the filter, after the temperature raising process is terminated, the oxygen supplying process that stops the ignition with the ignition plug to stop combustion in the cylinder, stops the injection of the fuel from the fuel injection valve, and allows the air to flow to the filter to burn the particulate matter collected by the filter.

13. A control method for a vehicle, wherein the vehicle includes:

an internal combustion engine including a cylinder, a fuel injection valve configured to inject fuel into the cylinder, an ignition plug configured to perform ignition in the cylinder, an exhaust passage through which exhaust flows from the cylinder, and a filter configured to collect particulate matter from the exhaust; a motor-generator coupled to a crankshaft of the internal combustion engine; and a battery configured to be supplied with electric power from the motor-generator; the control method comprising:

executing an accumulation amount calculation process that calculates a PM accumulation amount that is an accumulated amount of the particulate matter collected by the filter;

in response to the vehicle decelerating and the PM accumulation amount being greater than or equal to a specified accumulation amount determined in advance, executing a filter regeneration process that stops injection of the fuel from the fuel injection valve during rotation of the crankshaft of the internal combustion engine so as to burn the particulate matter collected by the filter;

after the filter regeneration process is terminated, in response to the vehicle decelerating and a temperature of the filter being greater than or equal to a predetermined temperature threshold value, executing a firing process that injects the fuel from the fuel injection valve and performs ignition with the ignition plug; and after the firing process is terminated, in response to the vehicle decelerating and a speed of the vehicle being less than or equal to a specified speed determined in advance, executing a stopping process that stops the rotation of the crankshaft of the internal combustion engine, wherein the specified speed is a minimum speed of the vehicle allowing air required for the filter regeneration process to be supplied to the filter when the filter regeneration process is executed.

14. The control method according to claim 13, wherein an ignition timing of the ignition plug in the firing process is retarded from that when the firing process is not executed, and an amount of fuel injected during the firing process is less than an amount of fuel injected when the internal combustion engine is idling.

15. The control method according to claim 13, wherein the firing process is executed for a longer period when the temperature of the filter is higher, and the stopping process is executed in response to the temperature of the filter being less than or equal to a target temperature and the speed of the vehicle being less than or equal to the specified speed.

16. The control method according to claim 13, further comprising:

executing a deceleration force adjustment process that allows more electric power to be supplied from the motor-generator to the battery when the stopping process is executed than when the stopping process is not executed, wherein the deceleration force adjustment process is initiated before initiating execution of the firing process.

17. The control method according to claim 16, wherein the deceleration force adjustment process is executed to set a target value for a state of charge of the battery to be smaller than that set prior to initiating execution of a regeneration control, the regeneration control including the filter regeneration process, the firing process, the stopping process, and the deceleration force adjustment process.

18. The control method according to claim 17, wherein the deceleration force adjustment process is executed to further set an input upper limit value to be a value larger than that set prior to initiating the execution of the regeneration control, the input upper limit value is a maximum permissible power by which the battery can be charged, and in response to the speed of the vehicle becoming zero subsequent to the stopping process, the deceleration force adjustment process is terminated to return the target value for the state of charge of the battery and the input upper limit value to those prior to initiating the execution of the regeneration control.

19. The control method according to claim 7, wherein the filter regeneration process includes (a) a temperature raising process that stops the ignition with the ignition plug to stop combustion in the cylinder, performs the injection of the fuel from the fuel injection valve, and allows air-fuel mixture to flow to a catalyst without being burned in the cylinder, causing (i) the catalyst to generate heat by burning the air-fuel mixture and (ii) the heat generated by the catalyst to transfer to the filter, and (b) an oxygen supplying process, executed after the temperature raising process is terminated, that stops the ignition with the ignition plug to stop combustion in the cylinder, stops the injection of the fuel from the fuel injection valve, and allows the air to flow to the filter to burn the particulate matter collected by the filter.

* * * * *